US012752501B2

(12) United States Patent
Durham et al.

(10) Patent No.: US 12,752,501 B2
(45) Date of Patent: Oct. 6, 2026

(54) RV AND TRAILER COMPOSITE PANEL MANUFACTURING PROCESS WITH INTERLOCKING CONNECTIONS ASSEMBLY SYSTEM

(71) Applicant: CARBON LITE TRAILERS, INC., Lakewood, WA (US)

(72) Inventors: Chris Durham, Lakewood, WA (US); Nancy Joan Durham, Lakewood, WA (US)

(73) Assignee: CARBON LITE TRAILERS, INC., Lakewood, WA (US)

( * ) Notice: Subject to any disclaimer, the term of this patent is extended or adjusted under 35 U.S.C. 154(b) by 0 days.

(21) Appl. No.: 17/219,010

(22) Filed: Mar. 31, 2021

(65) Prior Publication Data

US 2022/0314559 A1 Oct. 6, 2022

(51) Int. Cl.

*B29C 70/68* (2006.01)
*B29C 65/00* (2006.01)

(Continued)

(52) U.S. Cl.

CPC ............ *B29C 70/68* (2013.01); *B29C 66/124* (2013.01); *B29C 70/443* (2013.01); *B32B 5/18* (2013.01);

(Continued)

(58) Field of Classification Search

CPC . B29C 65/483; B29C 65/485; B29C 66/0224; B29C 66/02241; B29C 66/1222; B29C 66/124; B29C 66/1244; B29C 66/12441; B29C 66/1246; B29C 66/126; B29C 66/301; B29C 66/303; B29C 66/3032; B29C 66/30321; B29C 66/30325; B29C 66/43; B29C 66/434; B29C 66/4342; B29C 66/43421; B29C 66/721;

(Continued)

(56) References Cited

U.S. PATENT DOCUMENTS 3,637,459 A * 1/1972 Parish ..................... F16L 59/00 428/116
4,608,103 A * 8/1986 Aldrich ............. B29C 66/91431 156/499

(Continued)

FOREIGN PATENT DOCUMENTS

WO WO-2020109342 A1 * 6/2020 ........... B29C 70/086

*Primary Examiner* — Michael A Tolin
(74) *Attorney, Agent, or Firm* — R. Reams Goodloe, Jr.

(57) ABSTRACT

A composite panel manufacturing process with interlocking connections. The method includes laying out the first sheet of pre-preg epoxy carbon fiber, upon a polished and released aluminum tool. A second sheet of epoxy fiberglass is laid out over the top side of the first sheet. Rigid structural foam is laid on top of the second sheet of epoxy fiberglass. A third sheet of pre-preg epoxy fiberglass is laid on top of the rigid structural foam. A fourth sheet of pre-preg epoxy carbon is laid on top of the third sheet of pre-preg epoxy fiberglass with heavy resin/top side out to form a plurality of panels. The plurality of panels are cured to form a multilayer panel. Core material is removed along one edge of a first multilayer panel to make a U-shaped channel having a base and parallel flanges. A grooved slot is cut along one edge of the next multilayer panel. The panels are joined at the corner using an adhesive.

14 Claims, 14 Drawing Sheets

(51) Int. Cl.

| | |
|---|---|
| ***B29C 70/44*** | (2006.01) |
| ***B32B 5/18*** | (2006.01) |
| ***B32B 7/12*** | (2006.01) |
| ***B32B 25/02*** | (2006.01) |
| ***B32B 38/00*** | (2006.01) |
| ***B62D 27/02*** | (2006.01) |
| ***B62D 29/04*** | (2006.01) |
| *B29K 63/00* | (2006.01) |
| *B29K 105/08* | (2006.01) |
| *B29K 309/08* | (2006.01) |

(52) U.S. Cl.

CPC ................ *B32B 7/12* (2013.01); *B32B 25/02* (2013.01); *B32B 38/0004* (2013.01); *B32B 38/105* (2013.01); *B62D 27/026* (2013.01); *B62D 29/048* (2013.01); *B29C 2793/0054* (2013.01); *B29C 2793/0072* (2013.01); *B29K 2063/00* (2013.01); *B29K 2105/0872* (2013.01); *B29K 2309/08* (2013.01); *B32B 2250/05* (2013.01); *B32B 2260/021* (2013.01); *B32B 2260/046* (2013.01); *B32B 2262/101* (2013.01)

(58) Field of Classification Search

CPC . B29C 66/7212; B29C 66/723; B29C 66/727; B29C 70/026; B29C 70/08; B29C 70/086; B29C 70/30; B29C 70/302; B29C 70/34; B29C 70/342; B29C 70/345; B29C 70/40; B29C 70/42; B29C 70/44; B29C 70/443; B29C 70/46; B29C 70/68; B29C 70/84; B29C 2793/0054; B29C 2793/0072; B29C 2793/009; B29K 2063/00; B29K 2105/0872; B29K 2309/08; B29L 2031/776; B32B 3/02; B32B 3/06; B32B 58/18; B32B 5/24; B32B 5/245; B32B 5/26; B32B 7/04; B32B 7/12; B32B 25/02; B32B 37/12; B32B 2037/1269; B32B 38/0004; B32B 38/10; B32B 38/105; B32B 43/003; B32B 2250/05; B32B 2250/40; B32B 2260/021; B32B 2260/046; B32B 2262/101; B32B 2262/106; B32B 2305/022; B32B 2305/08; B32B 2605/00; B32B 2607/00; B60P 3/32; B60P 3/36; B62D 27/023; B62D 27/026; B62D 29/04; B62D 29/043; B62D 29/045; B62D 29/048; B62D 33/046; F16B 11/006

See application file for complete search history.

(56) References Cited

U.S. PATENT DOCUMENTS

| | | | | |
|---|---|---|---|---|
| 5,680,934 | A * | 10/1997 | Jaegers | B65D 81/054 206/586 |
| 6,391,436 | B1 * | 5/2002 | Xu | C08G 59/3218 428/297.4 |
| 7,867,928 | B2 * | 1/2011 | Toni | B32B 27/08 442/241 |
| 8,973,241 | B1 * | 3/2015 | Gooch | B64D 11/003 428/116 |
| 9,007,739 | B2 * | 4/2015 | Fornes | C09D 5/24 361/117 |
| 9,835,189 | B2 * | 12/2017 | Engquist | F16B 5/01 |
| 2004/0065041 | A1 * | 4/2004 | Staats | E04C 2/365 52/592.1 |
| 2009/0235599 | A1 * | 9/2009 | Ware | B32B 13/04 52/794.1 |
| 2011/0293914 | A1 * | 12/2011 | Maurer | C08J 9/36 521/146 |
| 2012/0024477 | A1 * | 2/2012 | Kropp | C08G 59/50 525/122 |
| 2015/0064397 | A1 * | 3/2015 | Leong | B32B 3/266 428/137 |
| 2018/0320722 | A1 * | 11/2018 | Gooch | B64F 5/10 |
| 2019/0202142 | A1 * | 7/2019 | Uehara | B29C 43/20 |
| 2021/0323651 | A1 * | 10/2021 | Alter | B32B 7/12 |

* cited by examiner

| Sample Material | Sample Weight | Number of Bonded Surfaces | Connection Joint | Joint Cracked | Joint Failure |
|---|---|---|---|---|---|
| Pressboard / formica laminate 11"×11"×1" | 7 lbs | 2 |  | 600 lbs | 1000 lbs |
| Pressboard / formica laminate 11"×11"×1" | 7 lbs | 6 |  | 900 lbs | 1500 lbs |
| Carbon / foam laminate 11"×11"×1" | 2 lbs | 2 |  | No cracking until joint failure | 1400 lbs |
| Carbon / foam laminate 11"×11"×1" | 2 lbs | 4 |  | No cracking until joint failure | 1600 lbs |

RV AND TRAILER COMPOSITE PANEL MANUFACTURING PROCESS WITH INTERLOCKING CONNECTIONS ASSEMBLY SYSTEM

TECHNICAL FIELD

The present invention relates to an RV and trailer composite panel manufacturing process with interlocking connections, and, more particularly, to a light composite panel manufacturing process with interlocking connections suitable for constructing RV trailers using carbon, fiberglass and foam laminate.

BACKGROUND

As the auto industry converts to smaller, lighter weight and electric vehicles the demand for light weight, strong recreational vehicles as well as trailers to transport goods will continue to grow. The recreational vehicle market has been moving toward lightweight products for several years. While significant marketing efforts have been focused on light weight recreational vehicles, the products remain quite heavy due to the materials and manufacturing processes used.

Current standards of trailer production include stud and beam construction and fiberglass construction. Stud and beam construction requires the use of internal framework including wood or aluminum framework and the use of multiple types of fasteners. Fiberglass construction utilizes molds. Fiberglass and resin are applied in several ways including hand layup, chopper gun and infusion. Molded parts are assembled with fasteners. Each of these methods will produce parts that are heavy, inconsistent in material content due to manual application and labor intense.

The present invention overcomes the failings of the prior art.

BRIEF SUMMARY OF THE DISCLOSURE

This summary is provided to introduce, in a simplified form, a selection of concepts that are further described below in the Detailed Description. This summary is not intended to identify key features of the claimed subject matter, nor is it intended to be used as an aid in determining the scope of the claimed subject matter.

One general aspect includes a process and trailer composite panel manufacturing process with interlocking connections. The process also includes obtaining a first sheet of pre-preg epoxy carbon fiber having predetermined surface dimensions. The process also includes laying out the first sheet upon a tool; obtaining a second sheet made substantially of pre-preg epoxy fiberglass with surface dimensions substantially identical to the first sheet. The process also includes laying out the second sheet to cover the top side of the first sheet. The process also includes obtaining a rigid structural foam having substantially the same surface dimensions as the first sheet. The process also includes laying the rigid structural foam to cover the top side of the second sheet. The process also includes obtaining a third sheet of pre-preg epoxy fiberglass with surface dimensions substantially identical to the first sheet. The process also includes laying the third sheet of pre-preg epoxy fiberglass to cover the top of the rigid structural foam. The process also includes obtaining a fourth sheet of pre-preg epoxy carbon with surface dimensions substantially identical to the first sheet. The process also includes laying the fourth sheet of pre-preg epoxy carbon to cover the top of the third sheet of pre-preg epoxy fiberglass to form a plurality of panels. The process also includes curing the plurality of panels under high heat and pressure by heating in oven, autoclave or press to form a multilayer panel. The process also includes upon completion of the cure, the multilayer panel is demolded from the polished and released aluminum tool and allowed to cool. The process also includes repeating the above actions to make a next multilayer panel. The process also includes cutting the multilayer panel to make a predetermined structural shape and interconnecting joints by, removing core material along one edge of the multilayer panel to make a channel having a base and parallel flanges, and cutting a grooved slot along one edge of the next multilayer panel.

Another general aspect includes an improved process for manufacturing composite panel corner joints. The improved process also includes obtaining a first sheet of pre-preg epoxy carbon fiber having a length greater than its width and having a heavy resin side which we refer to as the top side. The process also includes laying out the first sheet of pre-preg epoxy carbon fiber with the heavy resin side down, upon a polished and released aluminum tool; obtaining a second sheet of pre-preg epoxy fiberglass substantially identical in dimensions to the first sheet. The process also includes laying out the second sheet of pre-preg epoxy fiberglass to cover the top side of the first sheet. The process also includes obtaining a rigid structural foam of variable thickness and having substantially the same dimensions as the first sheet of pre-preg epoxy carbon fiber. The process also includes laying the rigid structural foam to cover the top of the second sheet of epoxy fiberglass. The process also includes obtaining a third sheet of pre-preg epoxy fiberglass having substantially the same dimensions as the first sheet. The process also includes laying the third sheet of pre-preg epoxy fiberglass to cover the top of the rigid structural foam. The process also includes obtaining a fourth sheet of pre-preg epoxy carbon having substantially the same dimensions as the first sheet. The process also includes laying the fourth sheet of pre-preg epoxy carbon heavy resin/top side out to cover the top of the third sheet of pre-preg epoxy fiberglass to form a plurality of panels. The process also includes curing the plurality of panels under high heat and pressure to form a multilayer panel. The process also includes upon completion of the cure, the multilayer panel is demolded from the aluminum tool and allowed to cool. The process also includes repeating the above actions to make a next multilayer panel. The process also includes cutting the multilayer panel to make a side wall shape and interconnecting joints by, removing core material along one edge of the multilayer panel to make a U-shaped channel having a base and parallel flanges, cutting first and second grooved slots in the next multilayer panel. The process also includes coating the first multilayer panel with an adhesive. The process also includes applying an adhesive to the grooved slot in a second multilayer panel. The process also includes then affixing the first multilayer panel to the second multilayer panel. The process also includes where coating the first multilayer panel with an adhesive may include coating the base with a 2-part epoxy glue or epoxy panel adhesive. The process also includes where applying an adhesive to the grooved slot in a second multilayer panel may include coating with a 2-part epoxy glue or epoxy panel adhesive; matching the U-shaped channel with the first and second grooved slots in the second multilayer panel.

Another general aspect includes a process and trailer composite panel manufacturing process with interlocking connections. The process also includes obtaining a first sheet of pre-preg epoxy carbon fiber having a predetermined length and width. The process also includes laying out the first sheet made substantially of pre-preg epoxy carbon fiber upon a polished and released aluminum tool; obtaining a second sheet made substantially of pre-preg epoxy fiberglass with surface dimensions substantially identical to the first sheet. The process also includes laying out the second sheet to cover the top side of the first sheet. The process also includes obtaining a rigid structural foam having substantially the same length and width as the first sheet. The process also includes laying the rigid structural foam to cover the top side of the second sheet. The process also includes obtaining a third sheet of pre-preg epoxy fiberglass with a length and width substantially identical to the first sheet. The process also includes laying the third sheet of pre-preg epoxy fiberglass to cover the top of the rigid structural foam. The process also includes obtaining a fourth sheet of pre-preg epoxy carbon with surface dimensions substantially identical to the first sheet. The process also includes laying the fourth sheet of pre-preg epoxy carbon to cover the top of the third sheet of pre-preg epoxy fiberglass to form a plurality of panels. The process also includes curing the plurality of panels under high heat and pressure to form a multilayer panel. The process also includes upon completion of the cure, the multilayer panel is demolded from the polished and released aluminum tool and allowed to cool. The process also includes repeating the above actions to make a next multilayer panel. The process also includes cutting the multilayer panel to make a predetermined structural shape and interconnecting joints by, removing core material along one edge of the multilayer panel to make a channel having a base and parallel flanges, and cutting a grooved slot proximate one edge of the next multilayer panel.

Implementations may include one or more of the following features. The process may include coating the first multilayer panel with an adhesive, applying an adhesive to the grooved slot in a second multilayer panel, and then affixing the first multilayer panel to the second multilayer panel. The process may include coating the first multilayer panel with an adhesive including coating the base with a 2-part epoxy glue or epoxy panel adhesive. The process may include applying an adhesive to the grooved slot in a second multilayer panel by coating with a 2-part epoxy glue or epoxy panel adhesive and affixing the first multilayer panel to the second multilayer panel may include: matching the channel with grooved slots in a second multilayer panel, orienting the first panel to the second multilayer panel, and inserting a first flange into the grooved slots or a grooved slot and the proximal edge of the second multilayer panel.

BRIEF DESCRIPTION OF THE DRAWINGS

While the novel features of certain embodiments of the invention are set forth with particularity in the appended claims, the invention, both as to organization and content, will be better understood and appreciated, along with other objects and features thereof, from the following detailed description taken in conjunction with the drawings, in which:

Figure 1A:
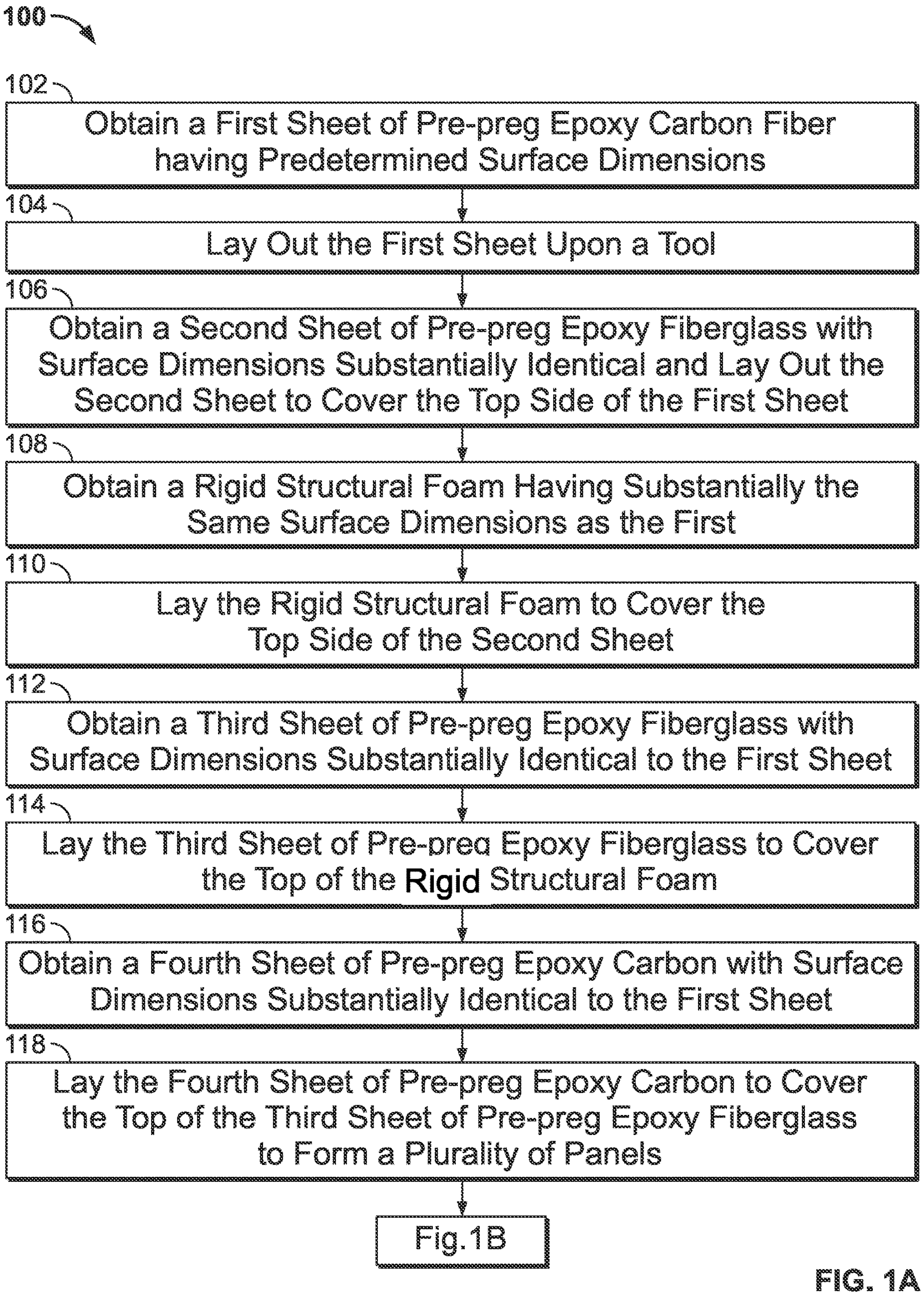
FIG. 1A schematically shows an example of a process for manufacturing composite panels.

In the drawings, identical reference numbers identify similar elements or components. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE EMBODIMENTS

The following disclosure describes an RV and trailer composite panel manufacturing process with interlocking connections. Several features of methods and systems in accordance with example embodiments are set forth and described in the figures. It will be appreciated that methods and systems in accordance with other example embodiments can include additional procedures or features different than those shown in the figures. Example embodiments are described herein with respect to a light composite panel manufacturing process using carbon and foam laminate with interlocking connections suitable for constructing RV trailers. However, it will be understood that these examples are for the purpose of illustrating the principles, and that the invention is not so limited.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one example" or "an example embodiment," "one embodiment," "an example" or combinations and/or variations of these terms means that a particular feature, structure or characteristic described in connection with the example is included in at least one embodiment of the present disclosure. Thus, the appearances of the phrases "in one example" or "in an example" in various places throughout this specification are not necessarily all referring to the same example or embodiment. Furthermore, the particular features, structures, or characteristics may be combined in any suitable manner in one or more embodiments.

Definitions

Generally, as used herein, the following terms have the following meanings when used within the context of composite panels:

The articles "a" or "an" and the phrase "at least one" as used herein refers to one or more.

As used herein, "plurality" is understood to mean more than one. For example, a plurality refers to at least two, three, four, five, ten, 25, 50, 75, 100, 1,000, 10,000 or more.

"Obtaining" is understood herein as manufacturing, purchasing, or otherwise coming into possession of.

Specific to the trailer industry, current construction norms include the use of stud walls, insulation and interior and exterior finishing materials, products constructed using our process result in a finished one piece, fully insulated, strong, light weight product. Construction using the improved process disclosed herein is faster and more efficient in the build phase than current standards in the travel trailer industry.

The process disclosed herein provides composite components that allow weight reduction in comparison to the conventional construction methods while increasing the strength and durability of, for example, RV and trailer component panels used in the production of various size and style trailers. The assembly process does not require fasteners or other structural reinforcement thus reducing production time and labor.

Referring now to FIG. 1A, an example of a process for manufacturing composite panels is schematically shown. A process for manufacturing composite panels 100 comprises a plurality of actions including obtaining a first sheet of pre-preg epoxy carbon fiber having predetermined surface dimensions and a top side 102. Next, the first sheet of pre-preg epoxy carbon fiber is laid out, upon a polished and released aluminum tool 104. A second sheet consisting substantially of pre-preg epoxy fiberglass is obtained with surface dimensions substantially identical to the first sheet, and the second sheet is laid out to cover the top side of the first sheet 106. A rigid structural foam of variable thickness having substantially the same surface dimensions as the first sheet of pre-preg epoxy carbon fiber is obtained 108 and the rigid structural foam is laid on top of the second sheet of epoxy fiberglass 110. A third sheet of pre-preg epoxy fiberglass having substantially the same surface dimensions as the first sheet is obtained 112 and laid on top of the rigid structural foam 114. A fourth sheet of pre-preg epoxy carbon having substantially the same surface dimensions as the first sheet of pre-preg epoxy carbon fiber is obtained 116 and the fourth sheet of pre-preg epoxy carbon is laid to cover the top of the third sheet of pre-preg epoxy fiberglass to form a plurality of panels 118.

Figure 1B:
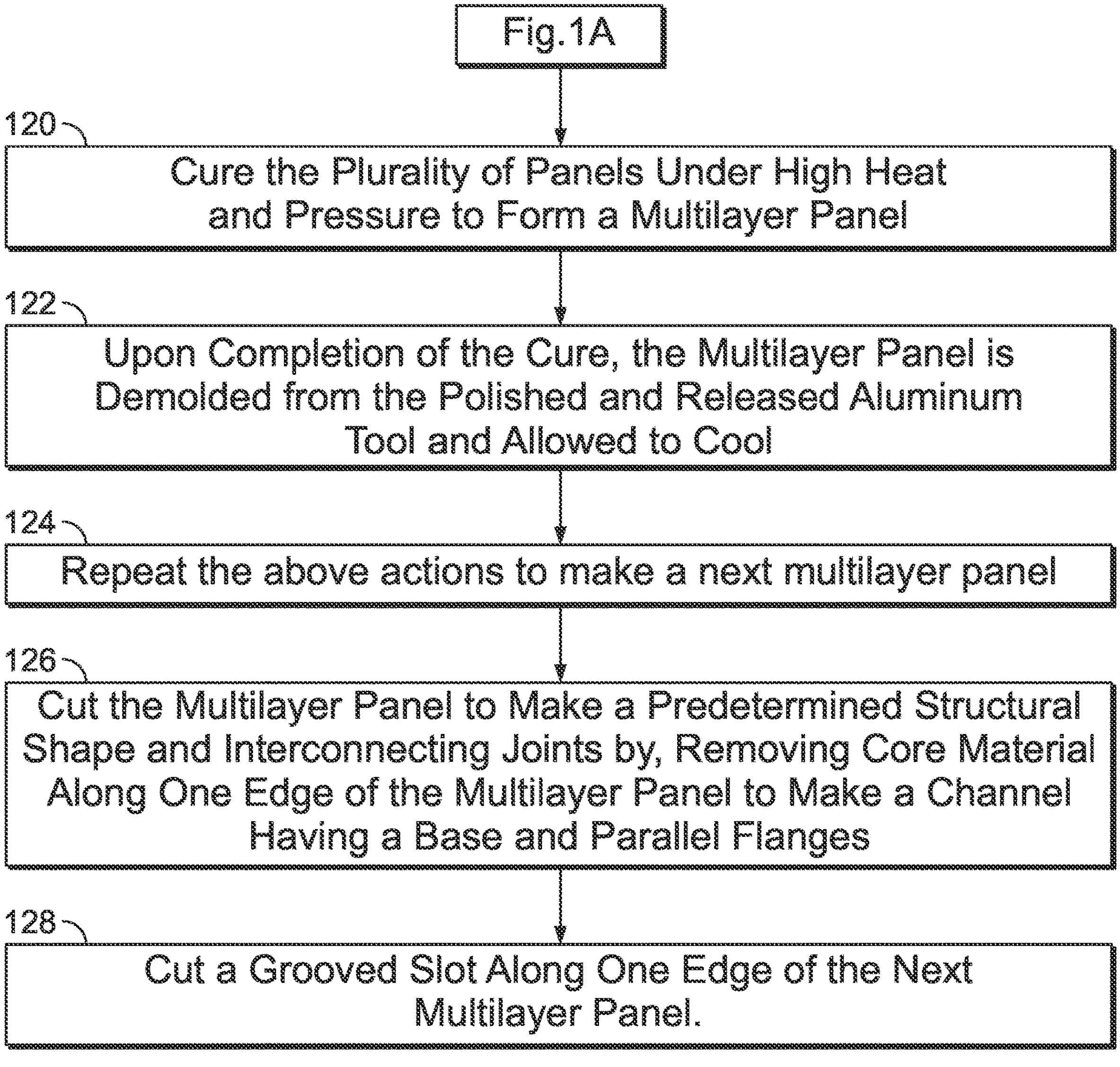
FIG. 1B is meant to be joined with FIG. 1A to complete the example of a process for manufacturing composite panels.

Referring now to FIG. 1B, meant to be joined with FIG. 1A to complete the example of a process for manufacturing composite panels. Next, the plurality of panels are cured to form a multilayer panel 120. Upon completion of the cure, which may vary in temperature and pressure via oven, autoclave or press depending on the project, the multilayer panel is demolded from the tools and allowed to cool 122. Repeat the above actions to make a next multilayer panel 124. Next the multilayer panel is cut to make a predetermined structural shape and interconnecting joints by removing core material along one edge of the multilayer panel to make a channel having a base and parallel flanges 126. A grooved slot is cut along one edge of another panel 128. A CNC machine, router or similar tool may be used to cut the side wall shape and interconnecting joints. Joint cuts can be also be made using a router and saw.

It will be understood that panels are laid atop each other such that the edges of each panel substantially coincide. That is, each of the four edges of a rectangular panel, for example, are substantially evenly placed to coincide with the four substantially equal edges of the other sheets.

Figure 2:
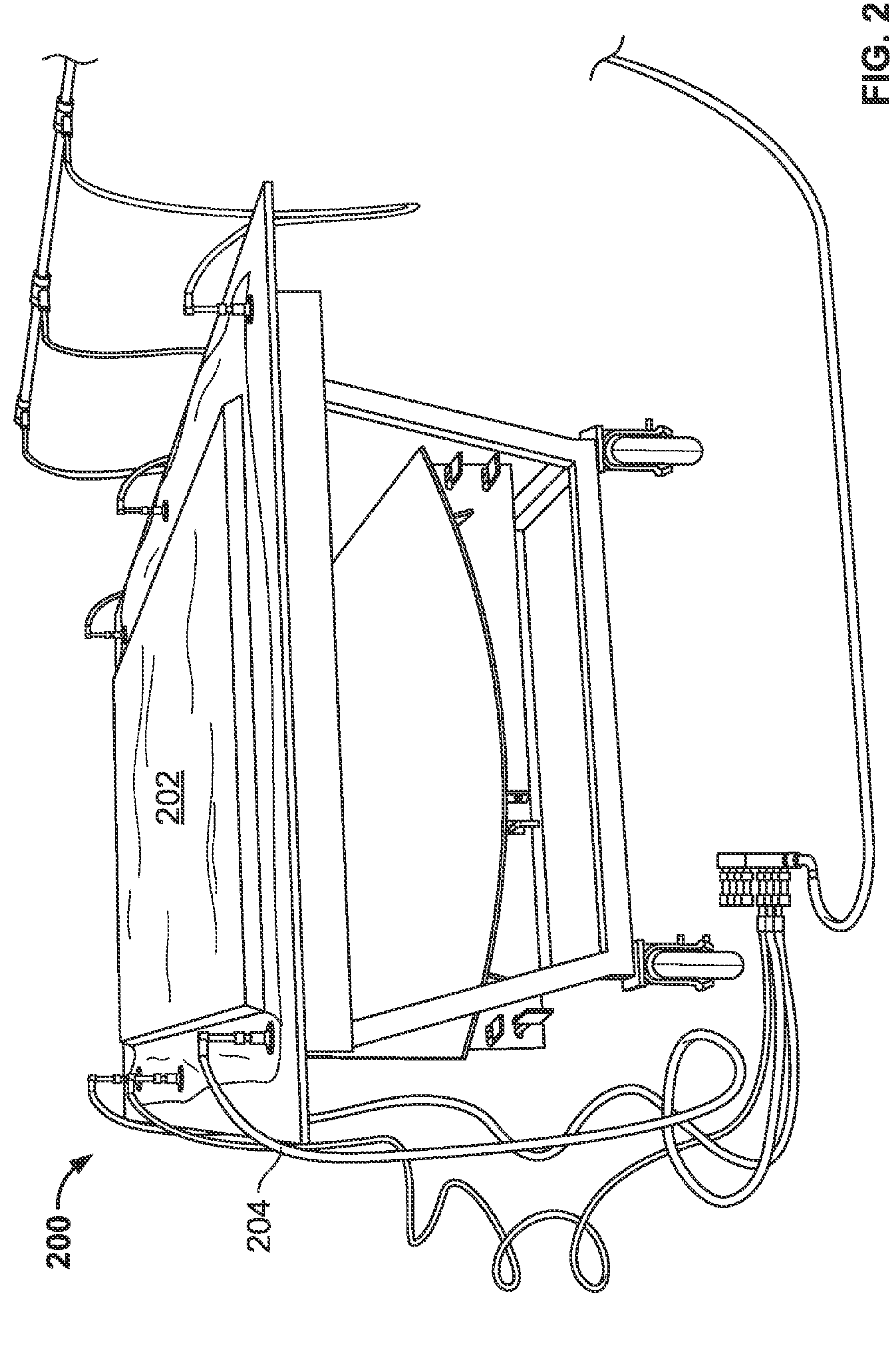
FIG. 2 schematically shows an example of tooling used in manufacturing composite panels.

Referring now to FIG. 2, an example of tooling used in manufacturing composite panels is schematically shown. The tool 200 is a conventional vacuum table made from aluminum or the like. A partially constructed composite panel 202 is shown laid out on the tool 200. A plurality of conduits 204 are used to draw a vacuum on the table while the composite panels 202 are constructed in a layered manner such as described above using high heat and pressure.

Pressure and heat characteristics applied may range from about 200°-300° F. at about 30-40 psi, to about 90 to 1000 psi at other temperatures depending on the application.

Figure 3:
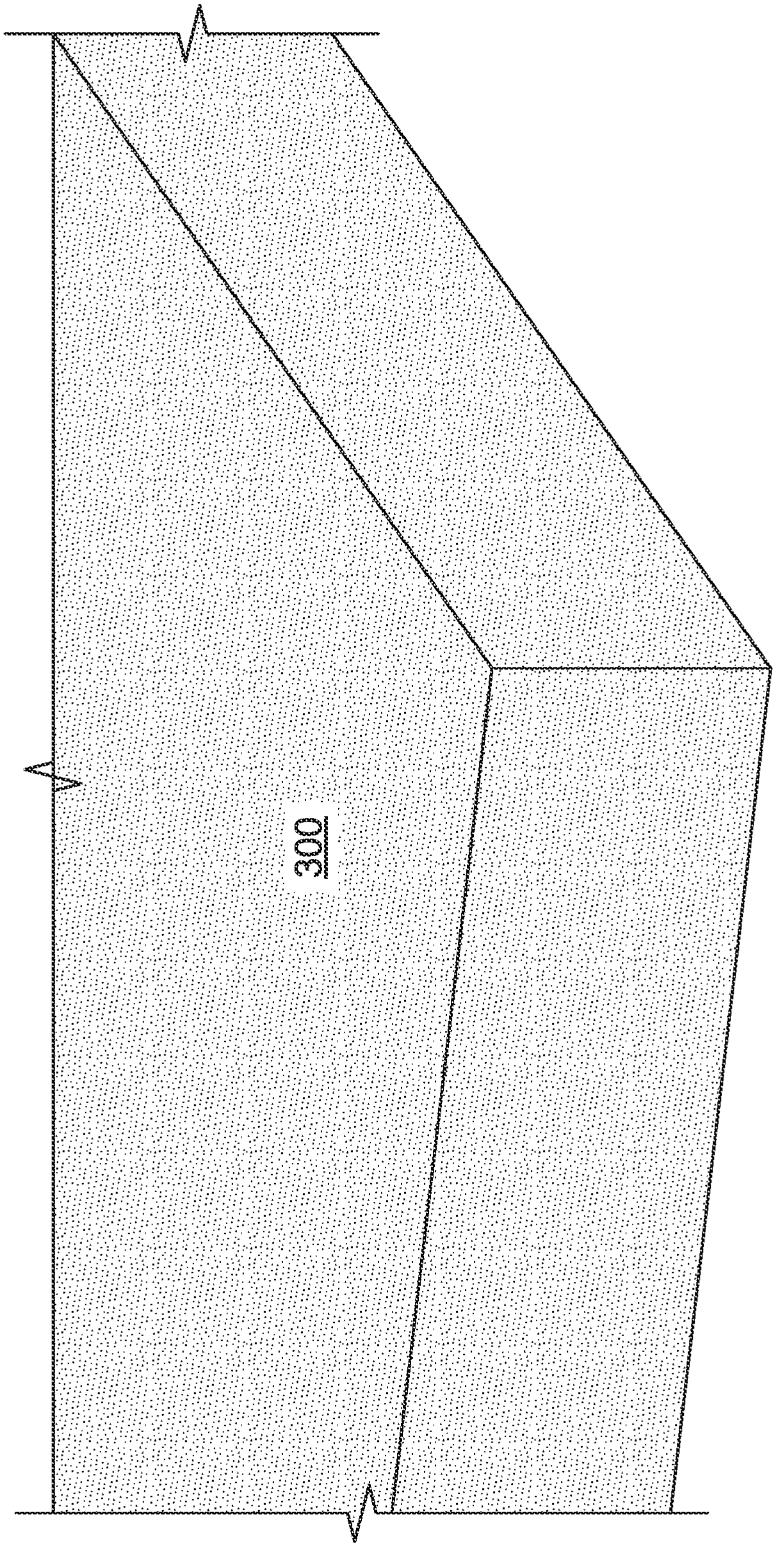
FIG. 3 schematically shows an example of structural foam that they be used for a core in the construction of composite panels.

Referring now to FIG. 3, an example of rigid structural foam that can be used for a core in the construction of composite panels is schematically shown. The rigid structural foam 300 may advantageously comprise polyethylene, polystyrene, polyurethane, polyvinyl chloride (PVC) and the like. A honeycomb foam structure may be used in place of the rigid structural foam. Those skilled in the art will understand that the density and thickness of the structural foam will vary depending upon the application. One useful structural foam may have a thickness of about 1 inch.

In one example, aircraft grade pre-impregnated (pre-preg) carbon and fiberglass sheets are combined with a rigid, structural foam core, placed in a mold then cured under high heat and pressure. Cure may be accomplished via compression, infusion or vacuum molding processes. The use of pre-preg materials ensures the same amount of resin and glass are used in each component part or panel, resulting in highly consistent products. In some examples one surface of the pre-preg epoxy carbon fiber is laid out, heavy resin side down, upon a polished and released aluminum tool. In one useful example related to manufacturing a light-weight RV trailer. The sheets of pre-preg epoxy carbon fiber and pre-preg epoxy fiberglass may have a thickness of about 1/4 inch before compression. After compression, the exterior pre-preg epoxy carbon fiber sheets may have a thickness of about 1/32 inch. Other thicknesses may be useful depending upon the application.

Figure 4:
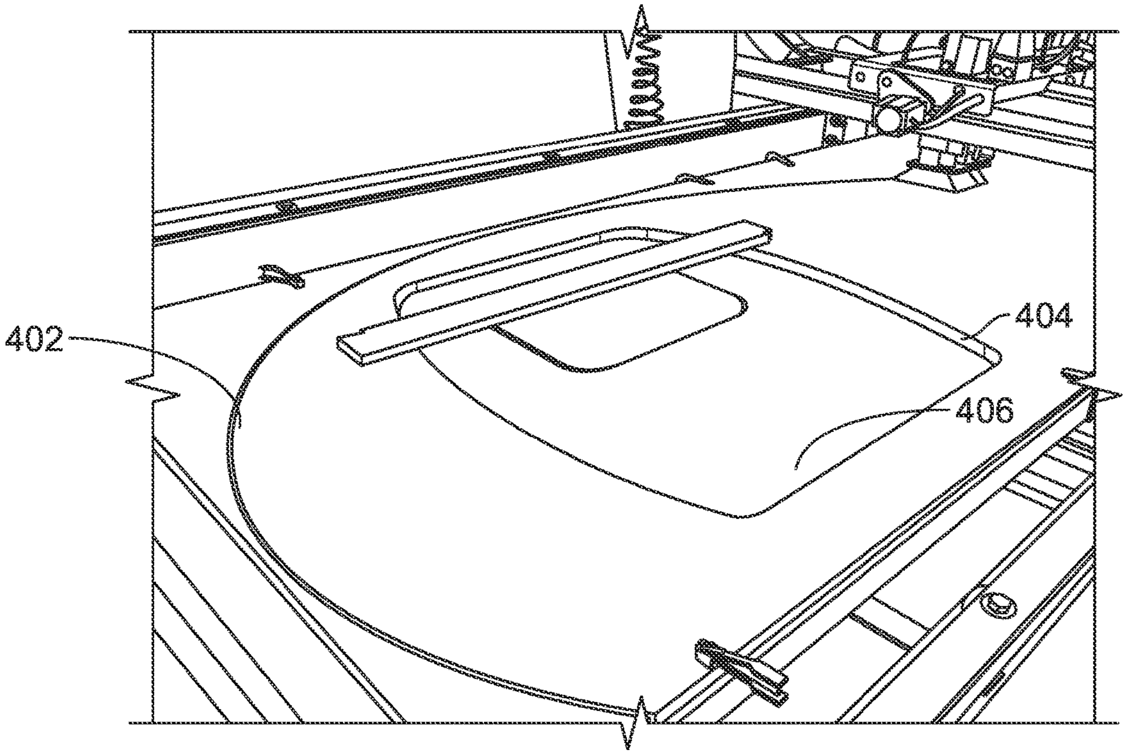
FIG. 4 schematically shows a top view of a side wall shape for use as an RV trailer component.

Referring now to FIG. 4, a top view of panels after a side wall shape suitable for an RV trailer component is shown. An example of a side panel 402 having a window 404 and comprised of a cut multilayer panel 406 is shown after the multilayer panel 406 is formed and cut.

Figure 5:
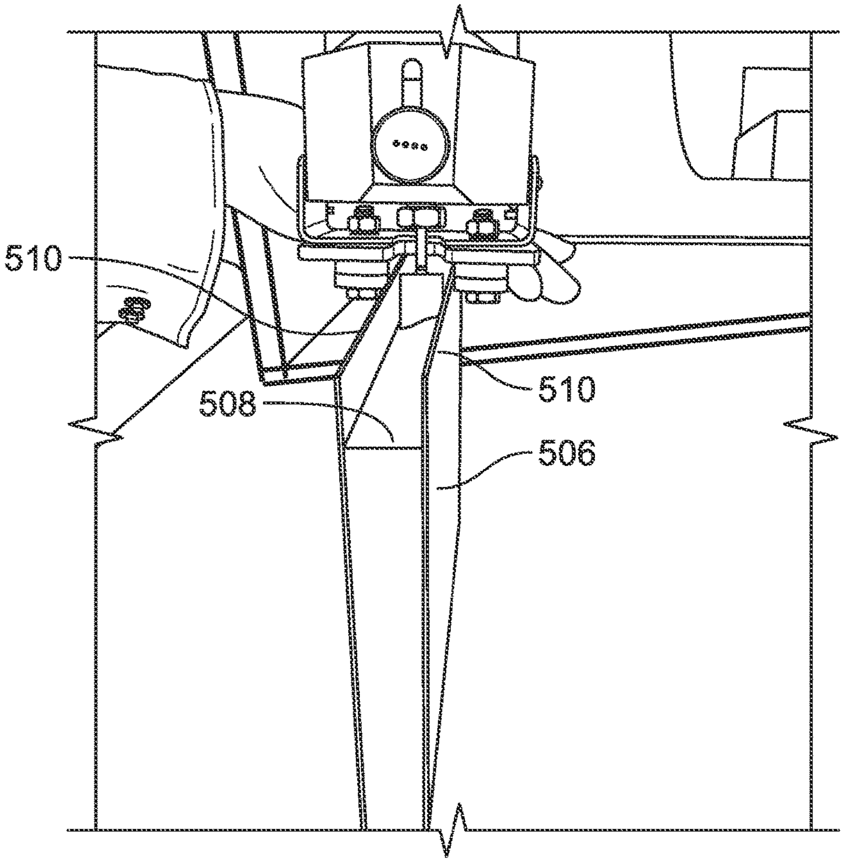
FIG. 5 schematically shows the process of removing core material from one edge of a first panel.

Referring now to FIG. 5, the process of removing core material from one edge of a first panel is schematically shown. A first multilayer panel 506 having a U-shaped channel 508 is shown. The U-shaped channel 508 has been routed out by using CNC, a router, saw or the like. The U-shaped channel 508 includes parallel flanges 510. The parallel flanges 510 oppose each other and run substantially along the length of channel 508. Other channel shapes may also be fabricated as described below.

Figure 6:
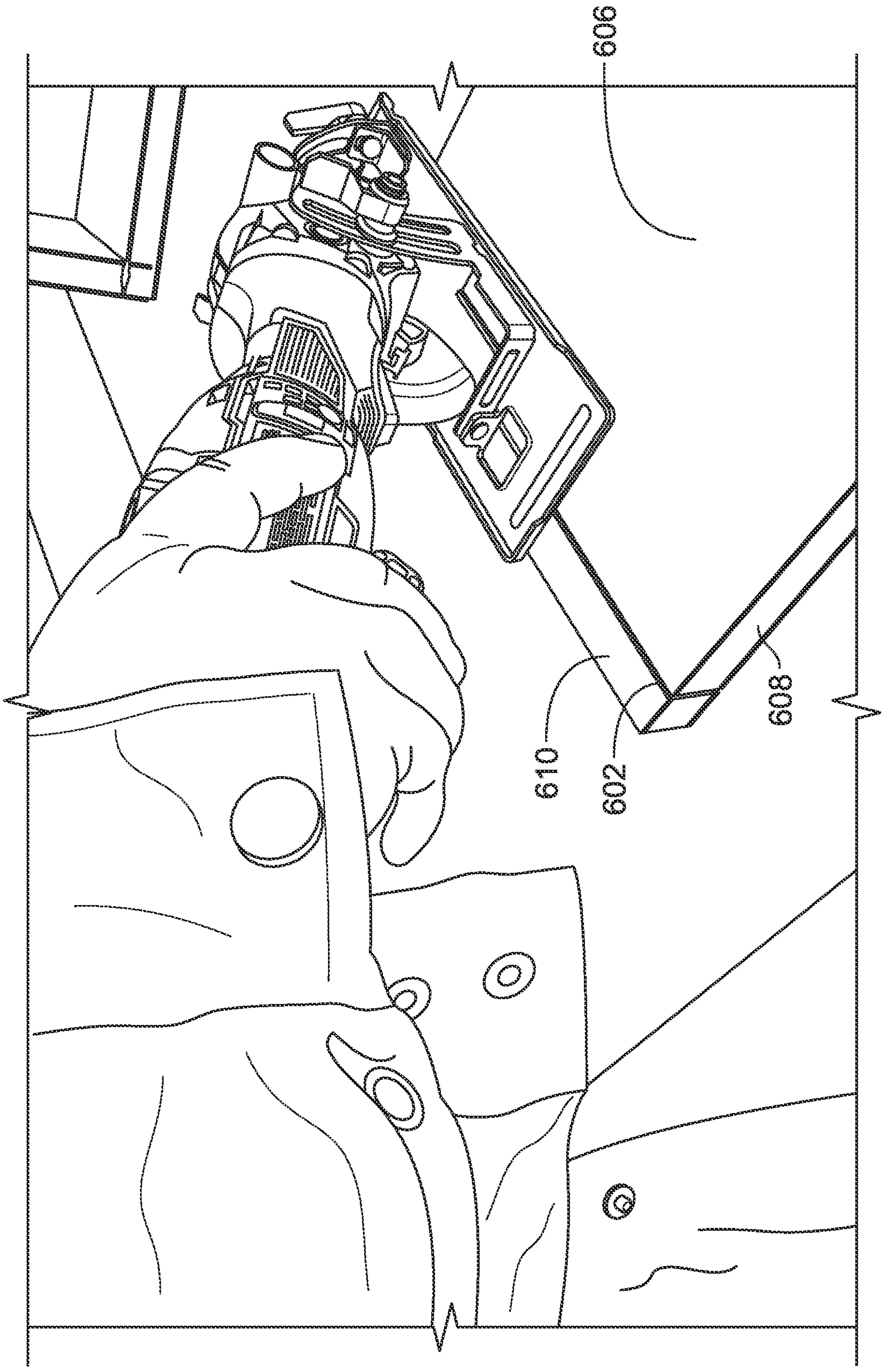
FIG. 6 schematically shows an example of a grooved slot cut along one edge of a second panel.

Referring now to FIG. 6, an example of a grooved slot cut along one edge of a second panel is shown. A second multilayer panel 606 has a grooved slot 602 cut to a depth of less than the width of the multilayer panel 606. In one example the depth of the cut may advantageously be through all but the bottom layer 608 of the multilayer panel 606 proximate an edge 610. The width between the grooved slot 602 and the edge 610 substantially equals the width of the U-shaped channel 508.

Figure 7B:
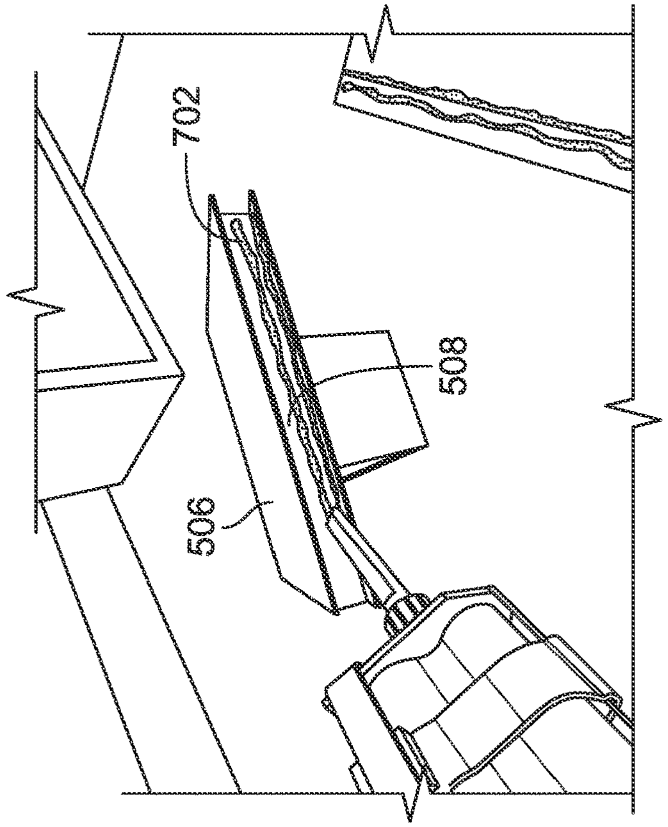
FIG. 7B schematically shows application of an adhesive to recessed edge of the core material.
Figure 7A:
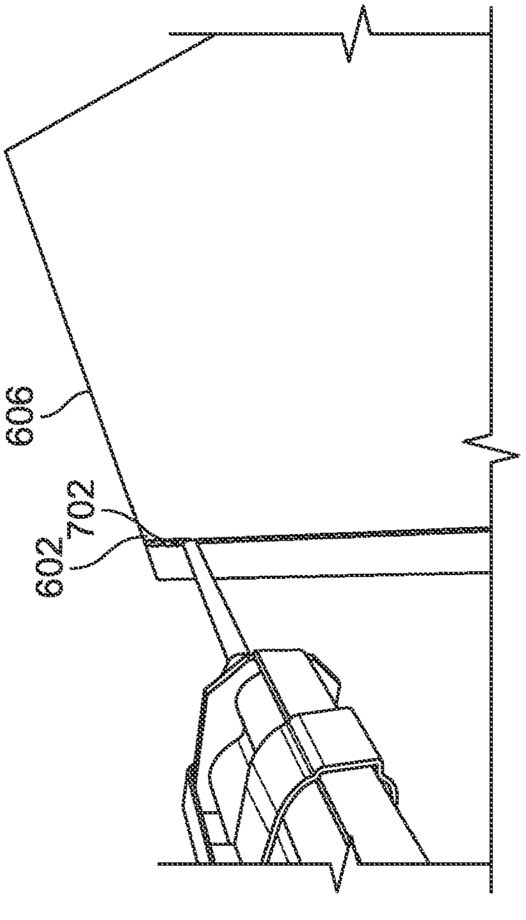
FIG. 7A schematically shows application of an adhesive to the grooved slot.

Referring now to FIG. 7A, application of an adhesive to the grooved slot is shown. The second multilayer panel 606 is coated with an adhesive 702. In one example the adhesive may comprise a 2 part epoxy glue or epoxy panel adhesive it is known to those in the art.

Referring now to FIG. 7B, application of an adhesive to recessed edge of the core material is shown. The U-shaped channel 508 is coated with an adhesive 702.

Figure 8A:
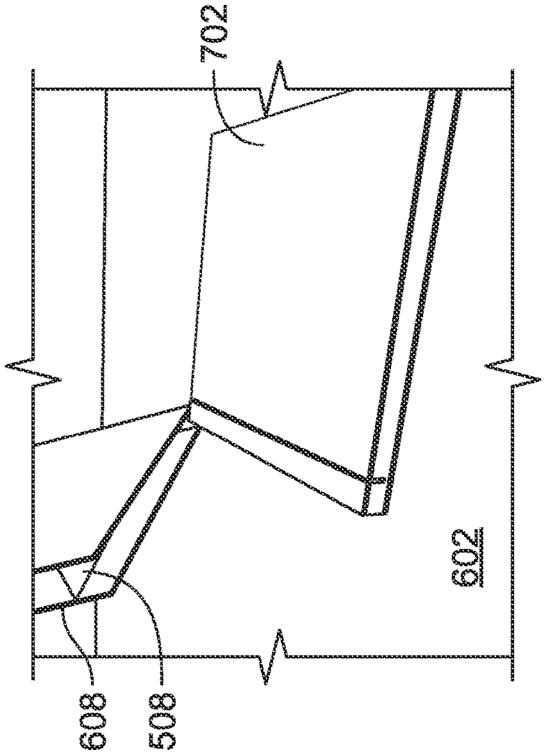
FIG. 8A-FIG. 8D schematically show an example connecting a first panel and a second panel to form a corner connection.
Figure 8B:
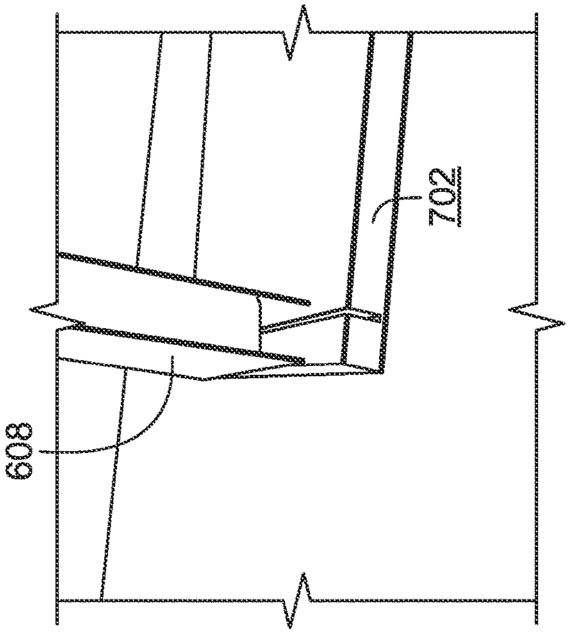
Figure 8C:
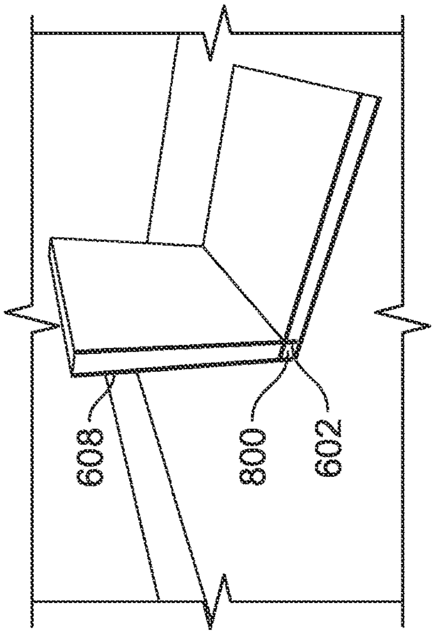
Figure 8D:
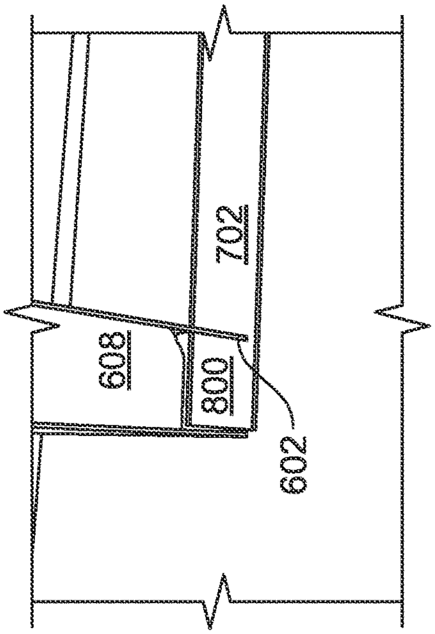

Referring now to FIG. 8A-FIG. 8D, an example connecting a first panel and a second panel to form a corner connection is schematically shown. After having applied the adhesive, as shown in FIG. 8A the U channel 508 is matched up with the grooved slot 602 in the second multilayer panel 606. (Note that the adhesive is not shown in these views in order to simplify the drawings for clarity, however it will be understood that when the two multilayer panels are joined the adhesive will have been applied). Referring now to FIG. 8B, the first panel 506 is oriented substantially perpendicular to the second multilayer panel 606 and positioned to insert a first flange 510 into the grooved slot 602 while the second flange contacts the proximal edge of the second multilayer panel. Referring now to FIG. 8C, the first panel 506 is now joined perpendicularly to the second multilayer panel 606 in order to form a bounded corner 800. FIG. 8C shows a close review of the bounded corner 800.

As will be described below, the methods described herein are not limited to right angle edge connection joints. The joints may be connected at oblique angles and also into a pair of grooves instead of one groove and an edge.

Figure 9:
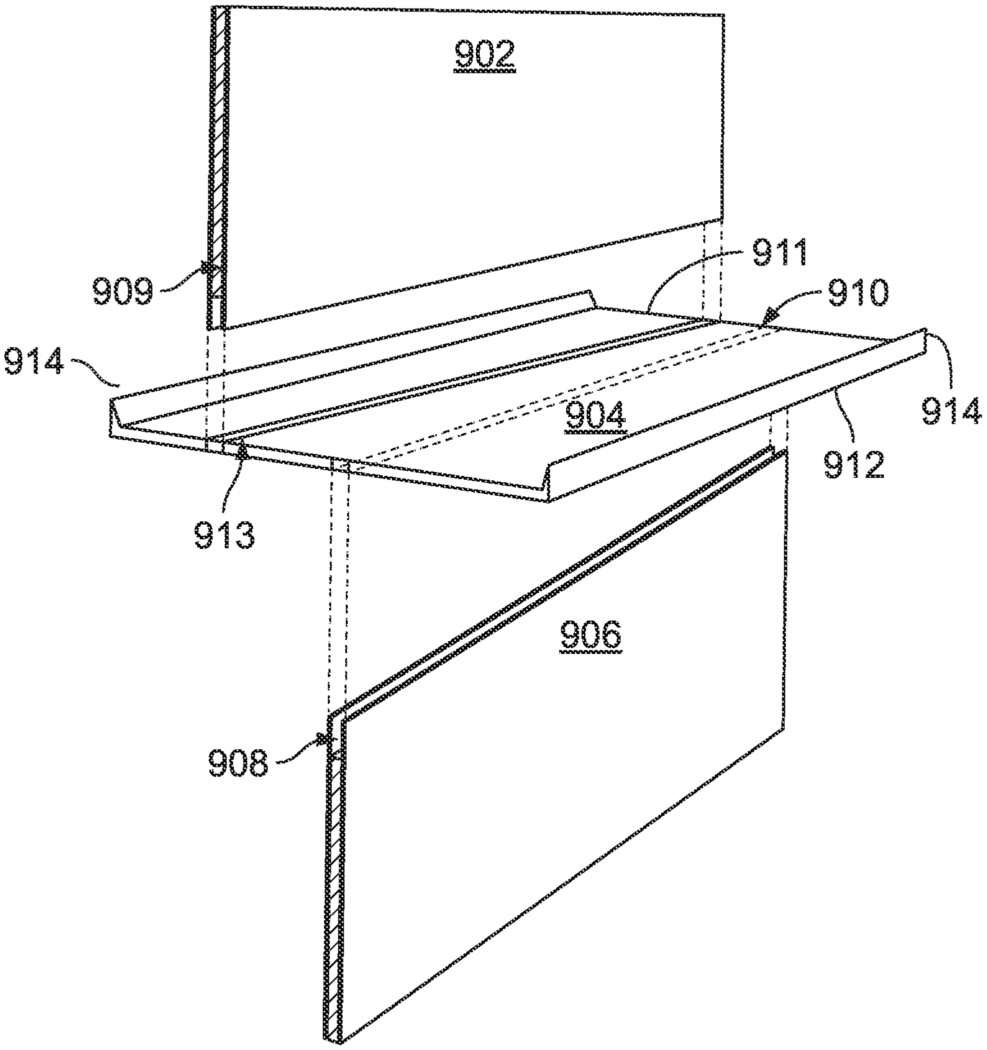
FIG. 9 shows an example of a type of complex structure that can be made using the process disclosed herein.

Referring now to FIG. 9, an example of a type of complex structure that can be made using the process disclosed herein shown. A shelf structure 900 adapted to be inserted into the rear of an RV trailer includes a first panel 902, a second panel 904 and a third panel 906. Panel 906 is routed out to form a U-channel 908 extending the length of the panel. Panel 904 has two grooves 910 cut along its length on a bottom side 912 and spaced away from the edges 914. Panel 904 also has two grooves 911 cut along its length on a top side 913 and spaced away from the edges 914. Panel 902 is routed out to form a second U-channel 909 extending the length of the panel.

To join the three panels 902, 904, 906, epoxy is applied to the grooves and channels as described above, the flanges of the channels are then inserted into the grooves as described above, thereby bonding panel 906 to the bottom surface of panel 904 and panel 902 to the top surface of panel 904. The resulting structure may then be incorporated into an RV trailer rear section.

Figure 10:
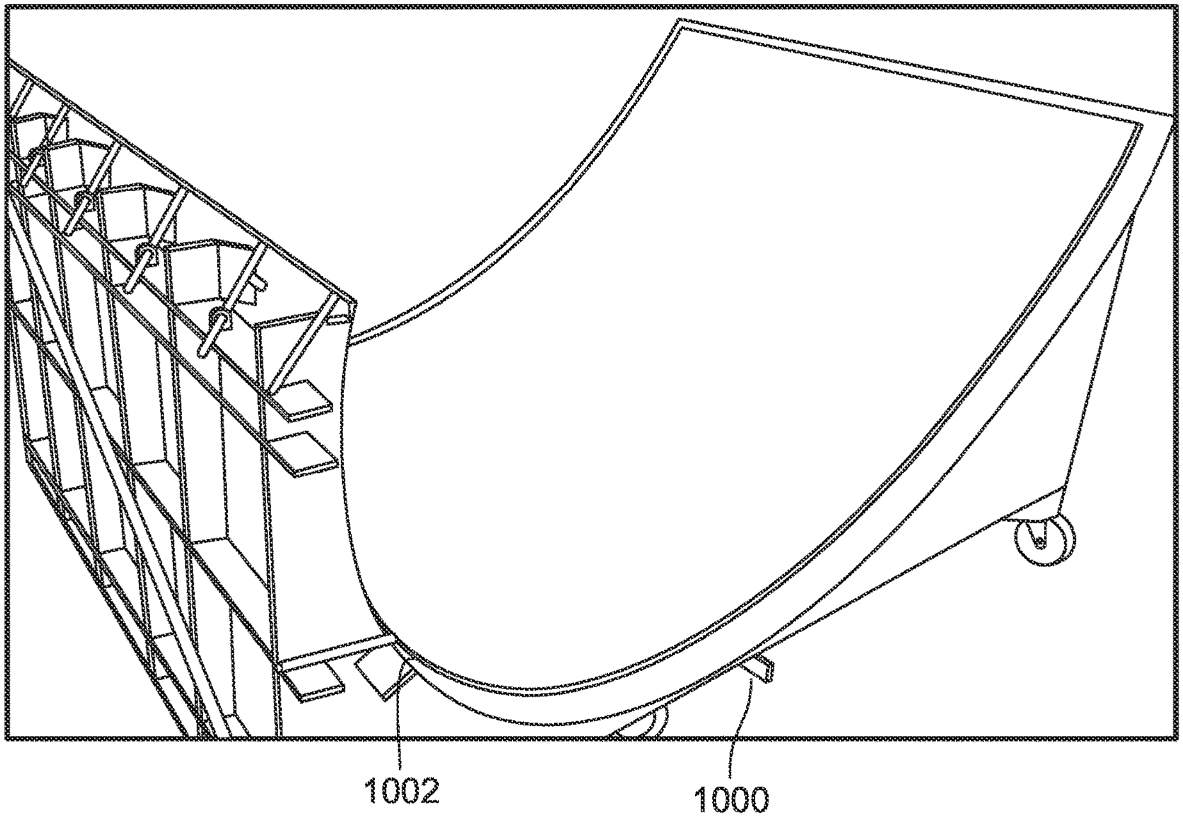
FIG. 10 shows an example of a curved mold used for shaping a structural component such as a curved trailer roof.

Referring now to FIG. 10, an example of a curved mold used for shaping a structural component such as a curved trailer roof is shown. A curved mold 1000 is substantially comprised of aluminum and used to mold curved surfaces such as an RV rooftop 1002 (as best shown in FIG. 12).

Figure 11:
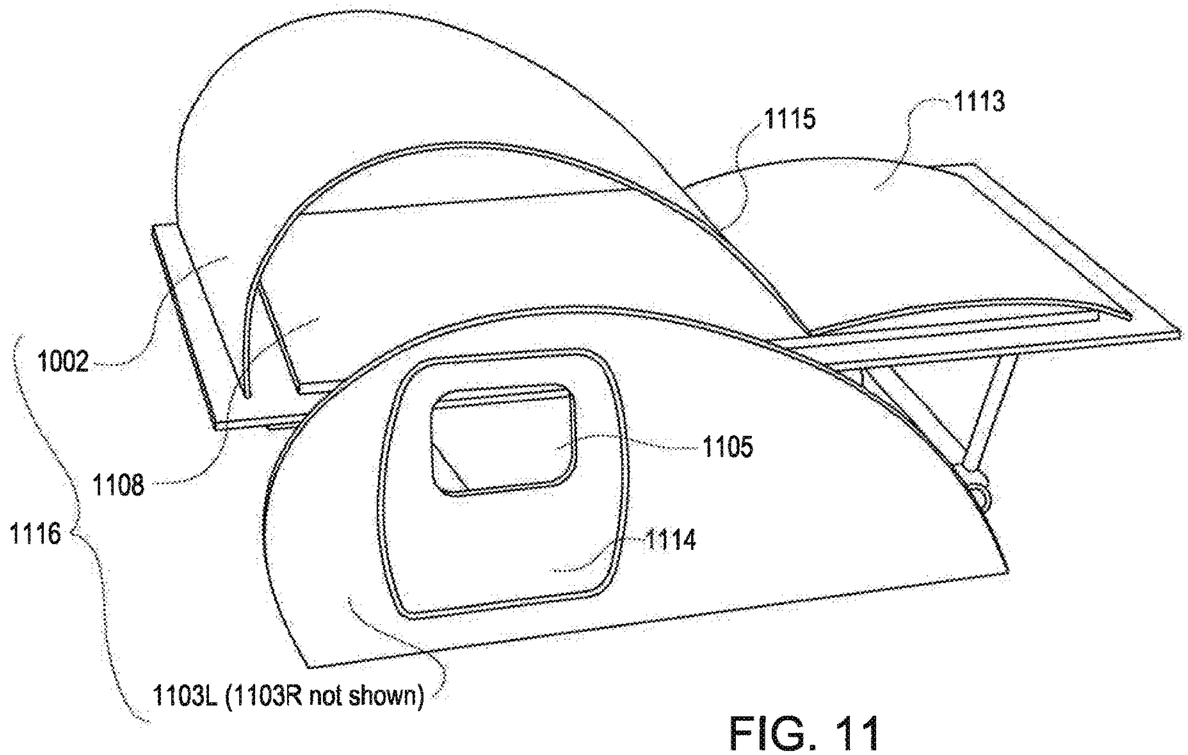
FIG. 11 shows an example of a curved structural component adapted to be joined to a side wall.

Referring now to FIG. 11, an example of structural components adapted to be joined together when building an RV trailer. A curved structural component, such as an RV rooftop 1002, is shown ready to be joined to a side panel 1103 and a floor 1108. The components are assembled using the multilayer panel fabrication and joint connection techniques described hereinabove. A side (wall) panel 1103 may include a window 1105 and door 1114. Together, the rooftop 1002, a pair of wall panels 1103 (e.g. a left side wall panel 1103L and a right side wall panel 1103R), and a floor panel 1108 may be joined together to form a trailer capsule 1116. A hatch 1113 is adapted to be hinged to the RV rooftop 1002 at a top end 1115 of the hatch.

Figure 12:
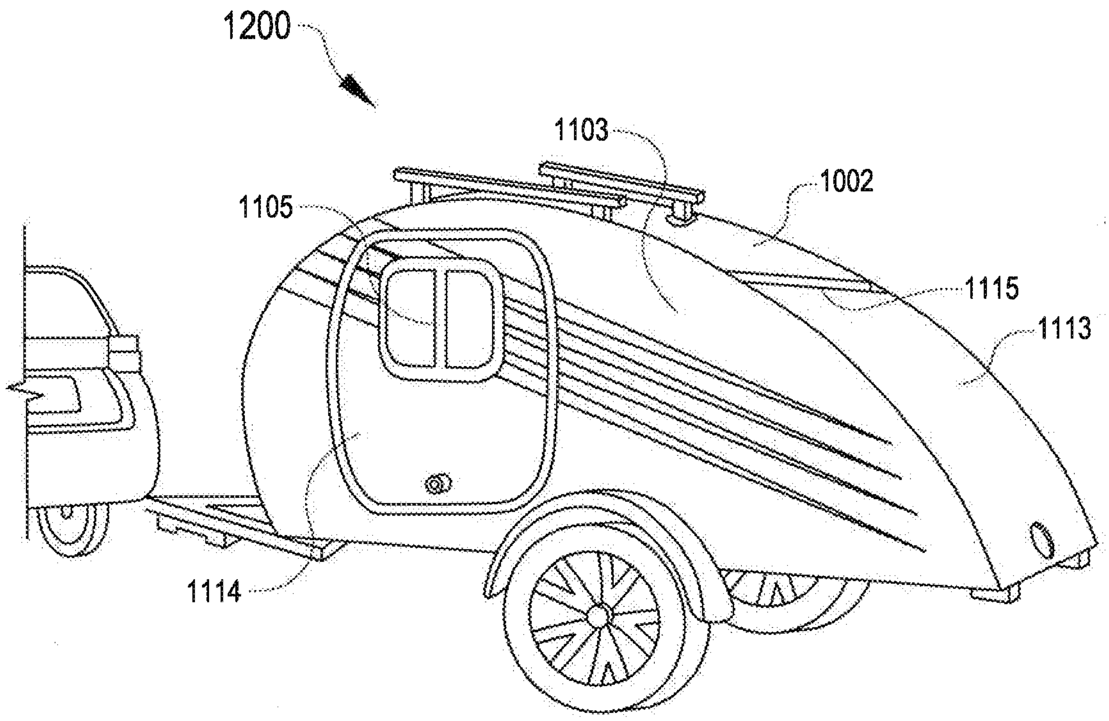
FIG. 12 shows an example of an RV trailer made in accordance with the principals disclosed herein.

Referring now to FIG. 12, an example of an RV trailer made in accordance with the principles disclosed herein is shown. An RV trailer 1200 is shown including components made in accordance with the technology disclosed herein. An RV rooftop 1002, is shown joined to a side panel 1103 with a window 1105 and door 1114. An RV trailer 1200 constructed using the process described herein has a base trailer weight of about 460 lbs. This compares with similar prior art tear-drop trailers having a base trailer weight of 1200-2000 lbs.

Figure 13:
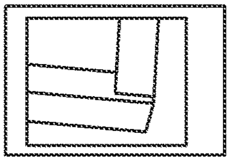
FIG. 13 shows an example of the strength of the disclosed connection joint as compared to other types of connection joints.
Figure 13:
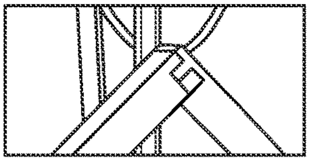
Figure 13:
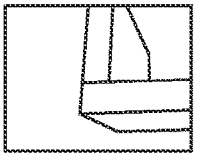
Figure 13:
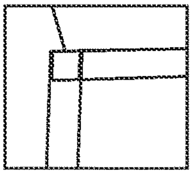

Referring now to FIG. 13, an example of the strength of the disclosed connection joint as compared to other types of connection joints is shown in tabular form. The inventors herein have conducted experiments to demonstrate the advantages of the carbon and foam laminate joint system. As shown in the table set out in FIG. 13, the carbon and foam laminate panels with the interlocking joint demonstrated a superior strength with no cracking until the joint failure at 1600 pounds. In comparison, pressboard and Formica® laminate with a butt joint cracked at 600 pounds and failed at 1000 pounds. Pressboard and Formica® laminate with a tongue in groove joint cracked at 900 pounds and failed at 1500 pounds. Finally, the carbon and foam laminate, joined with a butt joint, failed at 1400 pounds.

Figure 14A:
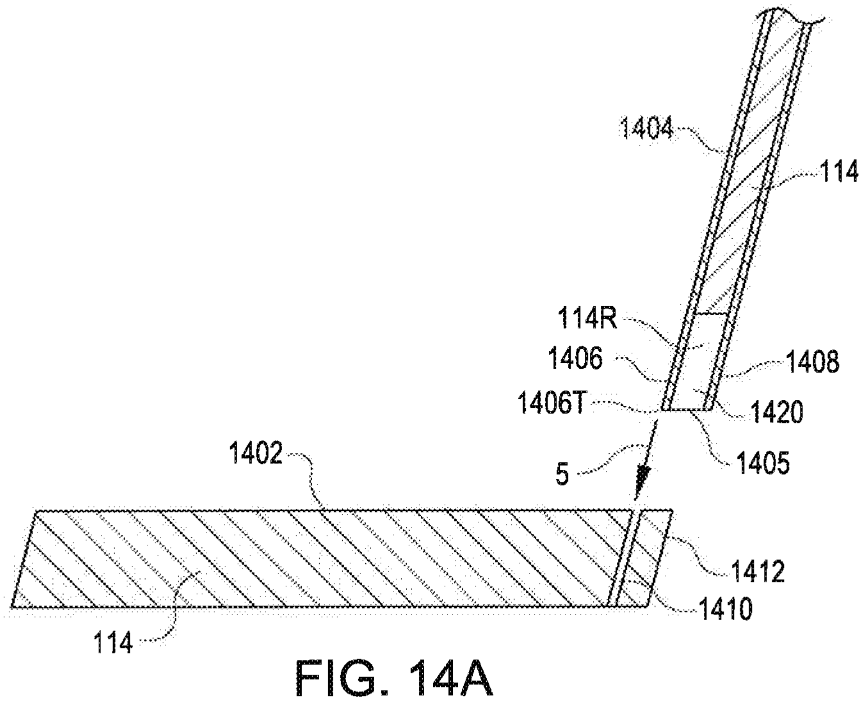
FIG. 14A schematically shows an example of two multilayer panels adapted to be joined at an oblique angle.
Figure 14B:
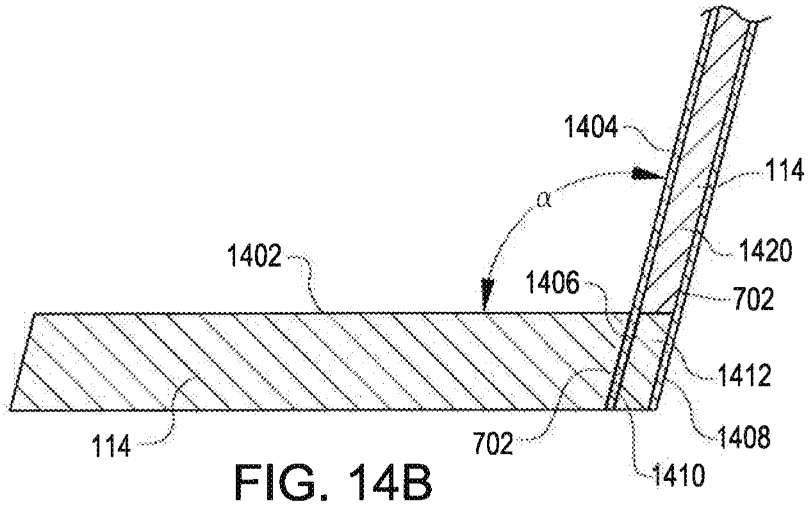
FIG. 14B schematically shows the two panels from FIG. 14A interconnected.

Referring now to FIG. 14A, an example of two multilayer panels adapted to be joined at an oblique angle is shown. A first composite panel 1402 is cut along one edge to form a first panel edge portion 1412 having a selected angle alpha ($\alpha$), as compared to the planar orientation of first composite panel 1402, as depicted in FIG. 14B. This procedure is also described above and is shown in FIG. 1A at process element 126: Cut the Multilayer Panel to Make a Predetermined Structural Shape and Interconnecting Joints by Removing Core Material Along One Edge of the Multilayer Panel to Make a Chanel Having a Base and Parallel Flanges. The first panel 1402 has a groove 1410 cut into it adjacent the first panel edge portion 1412. The groove 1410 penetrates through the rigid structural foam core 114, but stops before the second sheet of pre-preg epoxy fiberglass 110 which, before formation of the groove 1410, is located against the bottom side 114B of the rigid structural foam core 114. The groove 1410 is also oriented at a selected angle alpha ($\alpha$) to match the slope of the first panel edge portion 1412, and has a width approximating the thin width of flange 1406. Flange 1406 extends to a tip end 1406T. The second multilayer panel 1404 is also cut (also see FIG. 1A at process element 126, as described above) to make a second panel edge portion 1405 with a predetermined structural shape and having an angle complementary to the selected angle alpha ($\alpha$), as may be easily seen in FIGS. 14A and 14B. The second multilayer panel 1404 has a channel 1420 created by removal of a portion 114R of the rigid structural foam core 114, which creates a pair of exposed parallel flanges 1406 and 1408, the structure and composition of which was previously fabricated in accordance with the methods described above. A directional arrow 5 indicates the insertion direction of flanges 1406 and 1408 of panel 1404 into panel 1402. More precisely, flange 1406 is urged into groove 1410 until its tip end 1406T reaches the tip interior side 110T of the second sheet of (now cured) pre-preg epoxy fiberglass 110. At the same time, flange 1408 is urged downward against first panel edge portion 1412. While the structural details have just been explained, it should be understood that a suitable adhesive 702 is applied to the recessed edge portion of the rigid structural foam core 114R and to the groove 1410 and to first panel edge portion 1412, to form, upon cure of the adhesive 702, a strong, secure joint to create a strong composite structure.

Referring now to FIG. 14B, the two panels from FIG. 14A are shown interconnected. The epoxy application is shown here using adhesive 702 as described herein, which is applied to panels 1402 and 1404 as described above. When inserted, flange 1406 is inserted into groove 1410. The flange 1408 is epoxied to the edge 1412. Application of adhesive 702 is also described above and is shown in FIG. 7A and in FIG. 7B. In this way, an interconnection joint is made at an oblique angle alpha (α).

EXAMPLE

In one example the following process and materials were used to construct a composite panel.

A 10' of a 60" wide roll of pre-preg epoxy carbon fiber is laid out, heavy resin side down, upon a polished and released aluminum tool.

A like sized layer of pre-preg epoxy fiberglass is laid out on top of the carbon previously applied.

A 10'×60" rigid structural foam or honeycomb of variable thickness is laid down on top of the fiberglass.

A 10'×60" sheet of pre-preg epoxy fiberglass is laid out upon the foam core; and A 10'×60" sheet of pre-preg epoxy carbon fiber heavy resin/top side out is laid on top of the fiberglass.

Next, the plurality of panels are cured to form a multilayer panel. Upon completion of the cure, which may vary in temperature and pressure depending on the project, the multilayer panel is demolded from the tools and allowed to cool. Panels made in this way can be used in the assembly of a light-weight RV trailer.

Of course, it will be recognized by those skilled in the art having the benefit of this disclosure, that the sizes of the sheets may vary depending upon the ultimate application, although the process will be substantially the same.

To summarize, the instant process has the following advantages over existing methods. The composite and other materials used in the manufacture of the panels include Pre-preg fiberglass and carbon. Lightweight structural foam are used in the core of the panels. Epoxy resin adhesive are used to join corners. The process used in the manufacture of the composite wall panels (as described above with reference to FIG. 1) exhibits the following properties:

a) High heat (via oven, autoclave or press) vacuum bag or compression molding;
b) Produces fully insulated double walled panels;
c) Interconnecting joint system;
d) Allows assembly without fasteners;
e) Low profile joint interconnection;
f) Lightweight, strong and durable consumer product;
g) Increased fuel economy in vehicles when towing; and
h) Decreased wear and tear on tow vehicle.

Other advantages include;

a) Production of parts consistent in material content and weight;
b) Lighter weight product than competitors;
c) Allows smaller and electric vehicles to safely tow a trailer;
d) Wall, roof and floor panels allow easy, quick assembly of the trailer capsule;
e) Cost savings in production time and labor;
f) Sound absorbing materials;
g) Superior insulating qualities;
h) Water and moisture resistant;
i) Reduces mold and mildew;
j) No formaldehyde or other toxic chemicals or materials;
k) Sustainable; no deforestation occurs for its production; and
l) Longer RV life.

Certain exemplary embodiments of the invention have been described herein in considerable detail in order to comply with the Patent Statutes and to provide those skilled in the art with the information needed to apply the novel principles of the present invention, and to construct and use such exemplary and specialized components as are required. However, it is to be understood that the invention may be carried out by different equipment, and devices, and that various modifications, both as to the equipment details and operating procedures, may be accomplished without departing from the true spirit and scope of the present invention.

What is claimed is:

1. A method for manufacturing a joint between recreational vehicle composite components during assembly of a one piece fully insulated recreational vehicle capsule, comprising:

(a) forming a first composite component, by
  (i) providing a first multi-layer composite panel having common dimensions of length and width, and a plurality of layers, wherein the plurality of layers comprise:
    (1) a first sheet comprising a pre-preg carbon fiber layer, having a resin-heavy exterior side, and an interior side,
    (2) a second sheet comprising a pre-preg epoxy fiberglass layer disposed against the interior side of the first sheet,
    (3) a rigid structural foam core disposed against the second sheet,
    (4) a third sheet comprising a pre-preg epoxy fiberglass layer disposed against the rigid structural foam core, and
    (5) a fourth sheet comprising a pre-preg carbon fiber layer disposed against the third sheet;
  (ii) laying up the first multi-layer composite panel on a mold, with the resin-heavy exterior side of the first sheet facing the mold;
  (iii) compressing and curing the first multi-layer composite panel to form a cured first composite component, and
  (iv) removing the first composite panel component from the mold;
(b) forming a second composite component by repeating steps (a)(i) through (a)(iv) to provide a cured second composite component;
(c) cutting the cured first composite component along at least one of its length or width to define a first edge portion oriented at a selected angle alpha (α);
(d) cutting the cured second composite component along at least one of its length or width to define a second edge portion oriented at an angle complementary to the selected angle alpha (α);
(e) removing, along the second edge portion of the second composite component, the rigid structural foam core to a depth sufficient to form a channel having a recessed edge and opposing flanges, the opposing flanges comprising (i) a first flange defined by cured thicknesses of the first sheet and the second sheet, and (ii) a second flange defined by cured thicknesses of the third sheet and the fourth sheet;

(f) forming in the first composite component a first groove oriented at the angle alpha (α), the groove extending through the fourth sheet, the third sheet, and the rigid structural foam core, and terminating at an interior side of the second sheet, without penetrating the second sheet, thereby defining a flange receiving recess;

(g) applying adhesive to the recessed edge of the rigid structural foam core and to the first groove;

(h) joining the second composite component to the first composite component by inserting the first flange into the first groove until positioned adjacent the-interior side of the second sheet of the first composite component; and (i) wherein the first and second composite components are the recreational vehicle composite components, wherein the joint between the first and second composite components defines an interface between a composite wall panel and a composite roof panel or between a composite wall panel and a composite floor panel, or between a composite floor panel and a composite roof panel, and wherein the joint provides for assembly of a one piece fully insulated recreational vehicle structure configured for highway travel.

2. The method as set forth in claim 1, wherein the groove in the first composite component extends along a full width or full length of the first composite component.

3. The method as set forth in claim 2, wherein the angle alpha (α) is oblique, so that the first composite component and the second composite component are joined at an oblique angle.

4. The method as set forth in claim 1, further comprising:

(a) slicing a second groove in the first composite component, the second groove penetrating through, in the first composite component (1) the fourth sheet, (2) the third sheet, and (3) the rigid structural foam core, but not though (4) the interior side of the second sheet or (5) the first sheet, thereby creating a second flange receiving location in the first composite component;

(b) applying bonding adhesive to the second groove; and (c) affixing the second composite component to the first composite component by inserting the second flange into the second groove.

5. The method as set forth in claim 4, wherein the second groove in the first composite component extends along a full width or full length of the first composite component.

6. The method as set forth in claim 5, wherein the first composite component and the second composite component are joined at a ninety degree (90°) angle.

7. The method as set forth in claim 4, wherein applying adhesive to the recessed edge of the rigid structural foam core, and to the second groove, comprises coating each with a 2-part epoxy, and after affixing the second composite component to the first composite component, (2) providing time for the 2-part epoxy to cure.

8. The method as set forth in claim 1, wherein applying adhesive to (a) the recessed edge of the rigid structural foam core, and (b) to the first groove, comprises (1) coating each with a 2-part epoxy, and after affixing the second composite component to the first composite component, (2) providing time for the 2-part epoxy to cure.

9. The method as set forth in claim 1, wherein the second composite component is planar.

10. The method as set forth in claim 1, wherein the second composite component is curved.

11. A method for manufacturing a recreational vehicle having a composite structure, comprising:

(a) forming a first composite component, by (i) providing a first multi-layer composite panel comprising a plurality of layers having common length and width dimensions, and comprising, in order:

(1) a first sheet comprising a pre-preg carbon fiber layer, having a resin-heavy exterior side, and an interior side, (2) a second sheet comprising a pre-preg epoxy fiberglass layer, the second sheet pre-preg epoxy fiberglass layer disposed against the interior side of the first sheet, (3) a rigid structural foam core, disposed against the second sheet, (4) a third sheet comprising a pre-preg epoxy fiberglass layer disposed against the rigid structural foam core, and (5) a fourth sheet comprising a pre-preg carbon fiber layer having a resin-heavy exterior side, and an interior side disposed against the third sheet, (ii) laying up the first multi-layer composite panel on a mold with the resin-heavy exterior side of the first sheet facing the mold, (iii) compressing and curing the first composite component to form a completed, cured first composite component, and (iv) removing the first multi-layer composite component from the mold;

(b) forming a second composite component by repeating steps (a)(i) through (a)(iv) above to produce a cured second composite component;

(c) cutting the cured first composite component along at least one of its length or width to define a first panel edge portion oriented at selected angle alpha (α);

(d) cutting the cured second composite component along at least one of its length or width to define a second panel edge portion oriented at an angle complementary to the selected angle alpha (α);

(e) removing, along the second edge portion of the second composite component the rigid structural foam core to a depth sufficient to create a recessed edge of the rigid structural foam core, and form a channel having opposing flanges, the opposing flanges comprising (i) a first flange defined by cured thicknesses of the first sheet and the second sheet, and (ii) a second flange defined by cured thicknesses of the third sheet and the fourth sheet;

(f) forming, in the first composite component, at least one a groove oriented at the selected angle alpha (α), the groove extending through the fourth sheet, the third sheet, and the rigid structural foam core, and terminating at an interior side of the second sheet without penetrating the second sheet or the first sheet, thereby defining a flange receiving recess;

(g) applying an adhesive to the recessed edge of the rigid structural foam core, and the groove;

(h) joining the second composite component to the first composite component by inserting the first flange into the groove until positioned adjacent the interior side of the second sheet of the first composite component, to form a joint therebetween; and (i) wherein the first and second composite component comprise (A) a recreational vehicle single-piece composite wall panel and a recreational vehicle single-piece composite roof panel, or (B) a recreational vehicle single-piece composite wall panel and a recreational vehicle single piece composite floor panel, or (C) a recreational vehicle single-piece composite roof panel and a recreational vehicle single piece composite floor panel, and wherein the joint defines an interface between, respectively, the recreational vehicle single piece composite wall panel and the recreational vehicle single-piece composite roof panel, or between the recreational vehicle single-piece composite wall panel and the recreational vehicle single piece composite floor panel, or between the recreational vehicle single-piece composite roof panel and the recreational vehicle single-piece composite floor panel, all of which are configured for highway travel.

12. The method as set forth in claim 11, wherein the first composite component is planar.

13. The method as set forth in claim 11, wherein the first composite component is curved.

14. The method as set forth in claim 11, wherein the rigid structural foam core has thickness of about one (1) inch.

* * * * *